United States Patent
Nemoto

Patent No.: US 6,596,430 B2
Date of Patent: Jul. 22, 2003

(54) LITHIUM SECONDARY BATTERY AND TRANSPORTATION METHOD THEREOF

(75) Inventor: Hiroshi Nemoto, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 195 days.

(21) Appl. No.: 09/730,186

(22) Filed: Dec. 5, 2000

(65) Prior Publication Data

US 2001/0003024 A1 Jun. 7, 2001

(30) Foreign Application Priority Data

Dec. 7, 1999 (JP) .......... 11-347525
Dec. 7, 1999 (JP) .......... 11-347526

(51) Int. Cl.$^7$ .......... H01M 10/50
(52) U.S. Cl. .......... 429/48; 429/50; 429/94
(58) Field of Search .......... 429/50, 94, 48, 429/120; 180/65.3

(56) References Cited

U.S. PATENT DOCUMENTS 5,783,326 A * 7/1998 Hasebe .......... 429/231.1
6,150,057 A * 11/2000 Takeuchi .......... 429/144

FOREIGN PATENT DOCUMENTS

| EP | 0 910 129 A1 | * 4/1999 |
| JP | 07-192753 | 7/1995 |
| JP | 10-064549 | 3/1998 |
| JP | 10-233237 | 9/1998 |
| JP | 11-040200 | 2/1999 |
| JP | 11-045740 | 2/1999 |
| JP | 11-233150 | 8/1999 |

OTHER PUBLICATIONS

Kenshin Kitoh, et al., "*100 Wh Large Size Li–Ion Batteries and Safety Tests*," Journal of Power Sources, 81–82 (1999) 887–890.

* cited by examiner

*Primary Examiner*—Patrick Ryan
*Assistant Examiner*—Gregg Cantelmo
(74) *Attorney, Agent, or Firm*—Burr & Brown

(57) ABSTRACT

A method of transporting a lithium secondary battery includes transporting the battery including an electrode body obtained by winding or laminating a positive electrode and a negative electrode via a separator, and a non-aqueous electrolyte solution in a state where: $E/Cp+T_3<t$ ... (1) where E (J/g) is energy quantity per unit weight of said battery; Cp (J/° C.·g) is the specific heat of said battery; $T_3$ (° C.) is a normal transportation temperature of said battery; and t (° C.) is the lowest temperature at which said battery falls into an unsafe state.

6 Claims, 1 Drawing Sheet

LITHIUM SECONDARY BATTERY AND TRANSPORTATION METHOD THEREOF

BACKGROUND OF THE INVENTION AND RELATED ART STATEMENT

This invention relates to a lithium secondary battery and a transportation method thereof excellent in safety and suppression of the highest temperature increase of the battery so as to avoid accidents like explosion, fire, and the like even in the case where the battery temperature is increased following abrupt battery energy discharge due to internal short circuit and external short circuit or in the case where the battery temperature is increased due to an unexpected situation during transportation.

Recently, a lithium secondary battery has widely been employed as a power source battery for portable electronic appliances such as a mobile phone, a VTR, a note type computer, and the like. Moreover, the lithium secondary battery has about 4V voltage for a single battery, which is higher than the output voltage of a conventional secondary battery such as a lead-acid battery, and also high energy density, so that the lithium secondary battery attracts attention to the application possibility as a power source, other than for portable electronic appliances, for driving a motor of an electric vehicle (EV) or a hybrid electric vehicle (HEV), which is positively suggested to be commonly used as a low pollution vehicle being backed by a matter of recent environmental pollution. Further, application to a power source for electric installation such as a headlight and a powered window of a vehicle is taken into consideration.

In a lithium secondary battery, generally, a lithium-transition metal compounded oxide is used for a positive active electrode material, a carbon material for a negative active electrode material, and a non-aqueous electrolyte solution containing an organic solvent and a lithium ion electrolyte dissolved in the solvent for an electrolyte solution. Electrode bodies which perform the battery reaction may have various shapes such as a sandwich type, a wound type, a laminated type, and the like and with any structure, a negative electrode and a positive electrode are separated from each other with a separator.

Regarding a battery for EV or HEV, since high power is required to drive a motor, a relatively high capacity is necessary for a single battery. It is therefore preferable to use wound or laminated type electrode bodies for such applications and to produce these electrode bodies, electrodes (meaning a negative electrode and a positive electrode) to be employed are produced separately by forming a positive active electrode material layer on the surface of a current collector substrate generally made of a metal.

In this situation, if internal short circuit, external short circuit or overcharge occurs in a lithium secondary battery comprising wound or laminated electrode bodies, the temperature of the battery is increased owing to Joule equivalent heat generated attributed to the inner resistance of the electrode bodies. The temperature increase is naturally intense in the case of abrupt large current flow in an electrode body and it possibly results in an accident of explosion of a battery and may further result in a disaster.

The causes of temperature increase of a battery are understood to include inner causes and outer causes. For example, the inner cause supposedly includes the case that a metal waste, which is highly electrically conductive, is mixed in during the assembly and penetrates a separator if there is damage in the separator and in any case, the electrode plates are short circuited between them to cause high electric current flow. The Joule equivalent heat generated at that time heats and evaporates the non-electrolyte solution to increase the pressure within the cell, resulting in possible occurrence of a fire or an explosion of the battery.

On the other hand, as an external cause, a case that a nail or the like, which is highly electrically conductive, penetrates the inside of a battery may be a possible cause, and also in that case, the same phenomenon as that of the inner short circuit occurs. Further a case that short circuit occurs between a positive electrode terminal and a negative electrode terminal is a probable cause and in this case, the degree of the heat generation differs based on the extent of the load (resistance) at the time of external short circuit. Other than that, the external cause includes a case that overcharging occurs owing to a problem with a charging apparatus, or a case that the battery is put near a heat radiating apparatus such as an engine and heated.

The inventors of the present invention have studied the various types of causes of the temperature increase of a battery and published the results of temperature alteration of the battery of a nailing test, an external short circuiting test, an overcharging test, and an external heating test for a lithium secondary battery having 25 Ah capacity in The Journal of Power Sources, 81–82 (1999) pp. 887–890. Among the tests, the inventors observed that the highest temperature increase was caused in the nailing test, that is, in the case of internal short circuit occurrence and a temperature increase as high as to about 400° C. was observed.

Such a lithium secondary battery with a high capacity is equipped with a pressure relief valve to release the inner pressure of the battery when the battery's inner pressure is increased to a prescribed pressure to prevent an explosion attributed to the temperature increase of the battery. However, in the case where the increase of the battery's inner pressure is too sharp for the pressure relief to follow or where the pressure relief valve malfunctions, the explosion of the battery can not be avoided. Further, since the more fully the battery is charged, the more the energy to be discharged is increased, the temperature increase attributed to short circuit is considerable. Consequently, if the temperature of a battery is increased by some cause or other during the transportation of an assembled battery in a highly charged state, e.g. a fully charged state, from an assembling plant in one country to another place in the same country or to another country, the possibility of occurrence of an accident or hazard is increased.

The inventors of the present invention paid attention to the notion that though there are many causes of temperature increase of a battery, they are almost all attributed ultimately to the heating of the battery itself by the energy accumulated in the battery and that the temperature of the battery is most increased at the time of occurrence of an inner short circuit. In other words, the inventors have supposed that the temperature increase of the battery can be suppressed to a prescribed temperature or lower by satisfying prescribed relations between the energy quantity potentially accumulated in the battery and the specific heat (or the thermal capacity) of the battery itself, and have achieved the present invention.

SUMMARY OF THE INVENTION

The present invention provides a lithium secondary battery comprising an electrode body obtained by winding or laminating a positive electrode and a negative electrode via a separator, and a non-aqueous electrolyte solution, wherein the battery satisfies the following Equation (1):

$$E_0/Cp+T_1=T_2<t \quad (1)$$

where $E_0$ (J/g) is energy quantity per unit weight at the time of full charging of the battery; $Cp$ (J/° C.·g) is the specific heat of the battery; $T_1$ (° C.) is a normal use temperature of the battery; $T_2$ (° C.) is the highest elevated temperature of the battery; and t (° C.) is the lowest temperature at which the battery falls into an unstable state.

The present invention also provides a method of transporting a battery comprising an electrode body obtained by winding or laminating a positive electrode and a negative electrode via a separator, and a non-aqueous electrolyte solution, wherein the battery is transported in a state in which the following Equation (2) is satisfied:

$$E/Cp+T_3=T_2<t \quad (2)$$

wherein $E$ (J/g) is accumulated energy quantity per unit weight of the battery; $Cp$ (J/° C.·g) is the specific heat of the battery;

$T_3$ (° C.) is a normal transportation temperature of the battery;

$T_2$ (° C.) is the highest elevated temperature of the battery;

and t (° C.) is the lowest temperature at which the battery falls into an unstable state.

In this case, the highest elevated temperature $T_2$ is preferably the boiling temperature of the non-aqueous electrolyte solution or lower. Also the highest elevated temperature $T_2$ may be the boiling temperature of a component having the lowest boiling temperature among the main components of the non-aqueous electrolyte solution or lower. Further, the highest elevated temperature $T_2$ is also preferably the melting temperature of a component having the highest melting point among the main components of the separator or lower.

The present invention is suitable to a lithium secondary battery with a battery capacity of 2 Ah or higher at the time of full charge and to transportation of such a lithium secondary battery. Further, a lithium secondary battery and its transportation method of the present invention are suitable to be employed for an electric power source for an electric vehicle or a hybrid electric vehicle.

DETAILED DESCRIPTION OF PREFERRED EMBODIMENT

A lithium secondary battery (a battery) of the present invention is provided with an electrode body obtained by winding or laminating a positive electrode and a negative electrode via a separator, and a non-aqueous electrolyte solution. Nevertheless, as long as the battery has a high battery capacity, a coin type battery provided with an electrode body comprising a single positive electrode plate and a single negative electrode plate sandwiching a separator between them is by no means excluded as the battery of the present invention.

Figure 1:
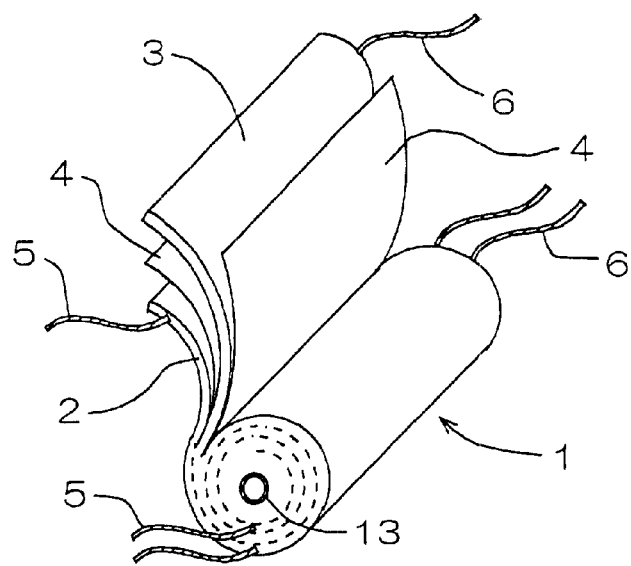
FIG. 1 is a perspective view illustrating the outline structure of a wound type electrode body.

FIG. 1 is a perspective view illustrating the outline structure of a wound type electrode body (hereafter referred to as a wound body). The wound body has a structure wherein electrodes 2, 3 (a positive electrode 2, a negative electrode 3) to which a plurality of current collection tabs (tabs) 5, 6 are attached are wound around the outer circumference of a winding core 13 while sandwiching separator 4 between them.

The positive electrode 2 is produced by forming a positive active electrode layer on both sides of a current collector substrate by applying a positive active electrode material to both sides of the current collector substrate. A metal foil such as an aluminum foil or titanium foil with high corrosion resistance to a cathodic electrochemical reaction is preferable to be used for the current collector substrate. Additionally, a punched metal or a mesh (a net) maybe employed for that. A lithium-transition metal compound oxide, e.g. lithium cobalt oxide ($LiCoO_2$), lithium nickel oxide ($LiNiO_2$), lithium manganese oxide ($LiMn_2O_4$), and the like, may be used as the positive active electrode material.

Application of various types of such positive active electrode materials to the current collector substrate (a metal foil) is carried out by applying a slurry or a paste produced by adding a solvent, a binder, and other substances to a positive active electrode material powder to a current collector substrate by a doctor blade method, a roll coater method, etc. and then drying the slurry or the paste. At the time of forming the positive active electrode material layer, in general, a carbon fine powder such as acetylene black or carbon black or the like may be added as a conductive material.

The negative electrode 3 may be produced in a similar manner as for the positive electrode 2. A metal foil such as a copper foil and a nickel foil with high corrosion resistance to the anodic electrochemical reaction is suitable to be employed for the current collector substrate of the negative electrode 3. Of course, a punched metal and a mesh may be employed. An amorphous carbon material such as soft carbon or hard carbon, or highly graphitized carbonaceous powder such as synthetic graphite or natural graphite may be used as the negative active electrode material.

A lithium ion permeable polyethylene film (PE film) having micro pores and made into a three-layer structure by being sandwiched between porous lithium ion permeable polypropylene films (PP films) is preferable to be used as a separator 4. The film is provided with a safety mechanism for suppressing lithium ion movement, that is, battery reactions by closing damaging micro-pores owing to softening of the PE film at about 130° C. in the event that the temperature of the wound body 1 is increased. By sandwiching the PE film with the PP films having a higher softening temperature, even in the event that the PE film is softened, the PP films keep the shape to prevent the positive electrode 2 and the negative electrode 3 from being brought into contact with each other and from being short-circuited between them and consequently the battery reaction is reliably suppressed and safety is surely attained.

At the time when the electrodes 2, 3 and the separator 4 are wound around the winding core 13, tabs 5, 6 are attached respectively to the un-coated parts where no active electrode material is applied in the current collector substrates of the electrodes 2, 3. The electrodes 2, 3, therefore, preferably have a stripe structure where at least one end of each of the current collector substrates is not coated with the active material layers. Various types of materials such as a metal, a resin, a ceramic, and the like may be used for the winding core 13 and in the case where a conductive material is used, the core has to be surely insulated from the electrodes 2, 3.

As the tabs 5, 6, foil-like materials similar to those of the current collector substrates of the respective electrodes 2, 3 are preferably employed. The tabs 5, 6 are attached to the electrodes 2, 3 by an ultrasonic welding or a spot welding method. In that case, as illustrated in FIG. 1, it is preferable to attach the tabs 5, 6 so as to arrange one of the tabs in one end face of one electrode of the wound body 1, for the tabs 5, 6 are kept from each other.

In the case of assembling a battery using the wound body 1 produced in the above described manner, at first the produced wound body 1 is inserted into a battery case and held at a stable position while electrical connection of the positive electrode terminal and the negative electrode terminal with the tabs 5 and the tabs 6 respectively, being secured to take electric current out. After that the wound body 1 is impregnated with a non-aqueous electrolyte solution and then the battery case is sealed to produce a battery. In the present invention, there is no limit to the shape and the structure of the battery case and of connection of the positive electrode and the negative electrode terminals with the tabs 5, 6 respectively in the wound body 1.

A preferable non-aqueous solution is a solution produced by dissolving one or more kinds of lithium electrolyte selected from lithium complexes with fluoro-compounds such as lithium hexafluorophosphate ($LiPF_6$), lithium fluoroborate ($LiBF_4$), and the like; lithium halides such as lithium perchlorate ($LiClO_4$) in a single solvent or a solvent mixture of carbonic acid ester type solvents such as ethylene carbonate (EC), diethyl carbonate (DEC), dimethylcarbonate (DMC) and propylene carbonate (PC), γ-butyrolactone, tetrahydrofuran, acetonitrile, and the like.

Figure 2:
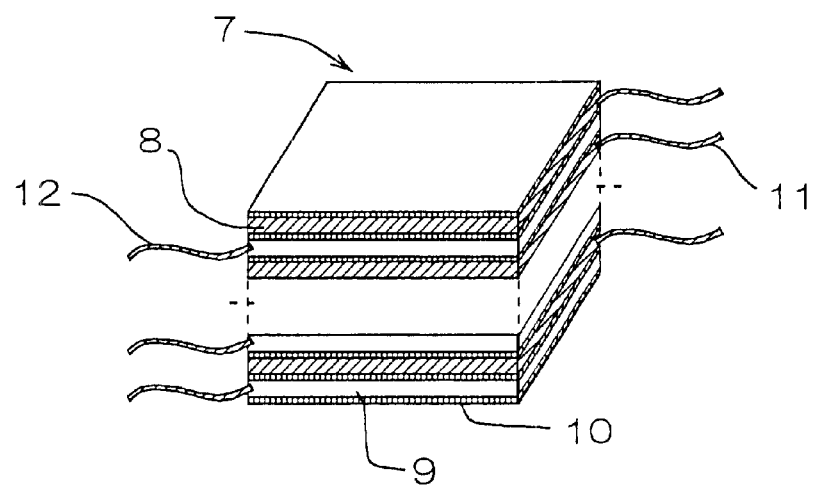
FIG. 2 is a perspective view illustrating the outline structure of a laminated type electrode body.

Next, a perspective view of a laminated type electrode body (hereafter referred to as a laminated body) 7 is illustrated in FIG. 2. The laminated body 7 has a structure where positive electrodes 8 and negative electrodes 9 are reciprocally laminated while separators 10 are sandwiched between the neighboring positive electrodes 8 and negative electrodes 9 and tabs 11, 12 are attached to each one of the electrodes 8, 9. Though the plane shape of the electrodes 8, 9 in FIG. 2 is rectangular, the shape may be any of various shapes such as circular or elliptical.

The same method for producing the electrodes 2, 3 to be used for the foregoing wound body 1 may be employed for producing the electrodes 8, 9. Also, there is no limit on the shape of the battery case for housing the laminated body 7, the terminal positions of the battery, and the outer shape of the battery and a separator, and a non-aqueous electrolyte solution similar to those for the wound body 1 maybe employed.

In the present invention, a battery is so configured using the above described wound body 1 or the laminated body 7 as to satisfy the following Equation (1):

$$E_0/Cp+T_1=T_2<t \quad (1)$$

wherein $E_0$ (J/g) is energy quantity per unit weight at the time of full charging of the battery;

$Cp$ (J/° C.·g) is the specific heat of the battery;

$T_1$ (° C.) is a normal use temperature of the battery;

$T_2$ (° C.) is the highest elevated temperature of the battery; and t (° C.) is the lowest temperature at which the battery falls into an unstable state by heat. At the time when a lithium battery is forwarded from a manufacturing place and transported to a prescribed place, the battery is so transported as to satisfy the following Equation (2):

$$E/Cp+T_3=T_2<t \quad (2)$$

wherein

E (J/g) is accumulated energy quantity per unit weight;

$Cp$ (J/° C.·g) is the specific heat of the battery;

$T_3$ (° C.) is a normal transportation temperature of the battery;

$T_2$ (° C.) is the highest elevated temperature of the battery; and t (° C.) is the lowest temperature at which the battery falls into an unstable state by heat.

In the foregoing description, E (J/g) denoting the accumulated energy quantity per unit weight practically means the charged energy quantity per unit weight of a battery and has a relation: $E \leq E_0$: with $E_0$ (J/g) denoting the energy quantity per unit weight at the time of fully charging the battery, so that the Equation (1) can be satisfied independently of the charged state. The specific heat of the battery $Cp$ (J/° C.·g) means the specific heat of the battery as a whole but not the specific heat of the electrode body. Moreover, it is clear that the Equations (1) and (2) can simultaneously be satisfied even in the case where the energy quantity $E_0'$ (J) is employed instead of $E_0$ or E and the heat capacity C (J/° C.) of the whole battery is employed instead of Cp. The energy quantity stored in the battery can be calculated from the charging capacity (a dischargeable capacity) of the battery.

The specific heat $Cp$ of the battery can be measured by putting the battery, which is warmed up as to keep even the inside of the battery at a prescribed constant temperature by setting the battery in a thermostat drier or the like, in water in a Dewar bottle and measuring the temperature increase. A more accurate specific heat of the battery can be measured by previously measuring the heat loss owing to heat radiation from the Dewar bottle using an ingot of a material whose specific heat is known.

The general use temperature $T_1$ (° C.) is usually room temperature and, for example, in the case of using the battery as a power source for electronic installation such as a headlight, a powered window, and the like of an automobile, the battery is usually set in a hood in which an engine is disposed, so that the use temperature may be set as the temperature of the part where the battery is put in the hood.

Also, the normal transportation temperature $T_3$ (° C.) is usually room temperature and it may be set at a proper and suitable value in consideration of the difference of transportation means such as an aircraft and a ship or the weather, e.g. the torrid zone, the frigid zone, in the transportation route (or a service route).

The highest temperature increase $T_2$ (° C.), as is clear from the Equations (1) and (2), means the temperature increase which the battery itself reaches by being warmed up by the energy accumulated in the battery. The lowest temperature t (° C.) at which the battery falls into an unstable state owing to heat means the temperature at which the non-aqueous electrolyte solution is evaporated or a positive electrode and a negative electrode are mutually short circuited or the reaction intensely starts, owing to the exothermic reaction of battery constituent components. Since the boiling point of the non-aqueous electrolyte solution differs depending on the type and the mixing ratio of the solvent of the non-aqueous electrolyte solution and the melting point also differs in the case where the material of the separator to be used is different, the lowest temperature t differs based on the design (the structure and the material to be used) of the battery.

Next, a method for designing a lithium secondary battery so as to satisfy the Equation (1) will be described below.

At first, the lowest temperature t is determined in consideration of thermal characteristics of materials, e.g. a non-aqueous electrolyte solution to be used, relevant to the unsafeness of the battery. Next, $T_2$ is optionally determined in consideration of the safety factor. The temperature $T_1$ is determined based on the method of the use and the installation place.

To determine Cp, at first, the specific heat of only the parts such as a battery case and battery terminals, besides the electrode body, is measured by a method employing the foregoing Dewar bottle and then the specific heat of only the electrode body is measured by the same method. It is preferable to measure solely the specific heat of the winding core in the case where the electrode body is a wound type and consequently, the specific heat of the part comprising positive electrodes, negative electrodes, and a separator can be measured.

After that, a battery is experimentally produced using materials whose specific heat is already known and while recording the weight of each member and Cp and $E_0$ of an actually produced battery (a first experimental product) are calculated. The $E_0$/Cp is calculated from the respective calculated values and while taking into consideration of $T_1$, the theoretical highest temperature increase (hereafter abbreviated as $T_2$') of the first experimental product can be calculated. In the case $T_2$' is higher than the previously determined $T_2$, the difference of $T_2$' and $T_2$ can be controlled to be within an allowable range by using at least either one of the following two methods.

One manner to be employed is performed by narrowing the surface areas of electrodes to be used as to lower $E_0$, for $E_0$ is supposed to be proportional to the surface area of the positive electrodes in the electrode body, in other words, by miniaturizing the electrode body. A battery (a second experimental product) is produced again by previously computing the more preferable surface area of positive electrodes in consideration of the loss of the weight of the electrode body, the loss of the quantity of the filling non-aqueous electrolyte solution following the loss of the weight of the electrode body, for example, if same parts, such as a battery case, besides the electrodes as those of the first experimental product are employed, or in consideration of the alteration of the thermal capacity following the weight increase of the winding core in the case where the diameter of the winding core for stably holding the electrode body in the battery case is widened.

In addition to that, it is preferable that the calculation is corrected based on the comparison of the average Cp calculated based on the members used for producing the first experimental product with the actual Cp of the actually produced first experimental product in the case of producing the foregoing secondary experimental product.

The other manner to be employed is performed by increasing the thermal capacity of the battery so as to reduce the temperature increase of the battery. Actually there are included a manner of enlarging the battery case, a manner of changing the member (the materials) to be used, a manner of adding a material having a proper thermal conductivity to the inner space of the battery or to the outer circumference of the battery, and the like. Those manners, however, sometimes result in the weight increase of the battery itself, that is, the deterioration of the weight energy density, and it is therefore preferable to employ such manners only in the case the difference of $T_2$' and $T_2$ of the experimental product is low. Of course, it is possible to employ two of the foregoing methods in combination.

Cp, $E_0$ of the battery (the second experimental product) produced again by the foregoing methods are measured to calculate $T_2$', and $T_2$' is compared with previously determined $T_2$ to examine whether the results meet the conditions or not. Precise designing conditions for a battery can be obtained by repeating such procedures at least several times, though it depends on the accuracy of the calculation at the time of the foregoing amendment of the surface area of the positive electrodes. In the case of altering the size of a battery case or the like, it is preferable to take the alteration of the thermal capacity following the size alteration into consideration.

In the case $T_2$' of the first experimental product is lower than the determined $T_2$, the electrode body can be enlarged and in that case, if it is necessary for the battery case to be enlarged, the alteration of the thermal capacity following the enlargement of the battery case should be taken into consideration.

On the other hand, in the transportation method of a lithium battery, the application method of the Equation (2) is following. As in the case of the Equation (1), t is determined corresponding to the design of a battery and then the highest elevated temperature $T_2$ is determined. The normal transportation temperature $T_3$ can be determined based on the transportation method and Cp can previously be calculated by the foregoing separate measurement. E can definitely be determined in relation to $T_3$ determined by such a manner.

Next, the manner of determining the highest elevated temperature $T_2$ will be described. One method involves a step of setting the highest elevated temperature $T_2$ to be not higher than the boiling temperature of the non-aqueous electrolyte solution. For example, the boiling point of a solvent employed for the non-aqueous electrolyte solution is 241° C. for PC, 248° C. for EC, 127° C. for DEC, and 90° C. for DMC. Where such solvents are mixed, the boiling point of the mixture is sometimes increased owing to intermolecular reaction and also the respective components sometimes start evaporating at the boiling point.

For that, the boiling point of the non-aqueous electrolyte solution defined in the present invention means the temperature at which at least one component of the non-aqueous electrolyte solution starts evaporating. The boiling point is changed by the external pressure and the external pressure applied to the non-aqueous electrolyte solution of the battery is the internal pressure of the battery and generally at the atmospheric pressure. Nevertheless, the pressure can be changed by the ambient temperature of the battery and the pressure of the inert gas used for sealing the battery.

Another embodiment of the transportation method is actualized by setting the highest elevated temperature $T_2$ to be the lowest temperature in the boiling points of main components of the non-aqueous electrolyte solution. That is based on the fact that evaporation of the components contained in small amounts is expected to not cause internal pressure increase to result in immediate rupture of the battery. The meaning of main components of the non-aqueous electrolyte solution does not practically mean components contained in some defined % or higher. For example, it is a matter of course, the main components mean both solvents A and B in the case of a mixture containing a solvent A and a solvent B in equal amounts and the solvent A is supposed to be a main component even in the case of 20% of the solvent A and 80% of the solvent B. On the contrary, the main component is supposed to be solely the solvent A in the case of a solvent mixture containing 98% of the solvent A and 2% of the solvent B. Whether a component is included in the main components or not can be determined by considering that a component which is contained only in an amount of 1/20 or lower relative to any other components is not a main component and such a condition can be employed as the determination standard.

In further another embodiment, the standard of the highest elevated temperature $T_2$ is set to be the highest temperature in the melting points of main constituent materials of the separator. For example, in the foregoing separator having three-layer structure comprising PP/PE/PP films, the melting point is high and if the PP films, which form the frames of the separator, are melted, the probability of direct contact of a positive electrode and a negative electrode is increased, so that it is preferable to ensure the safety of the battery by setting $T_2$ to be the melting point of the PP films or lower.

By the way, the foregoing Equation (1) and Equation (2) are premised on the assumption that the battery is kept in heat insulation state in relation to the ambient environments, but actually the heat is released from the battery surface to the outside if the battery temperature is increased, so that it may be said that the temperature of the battery hardly reaches the set $T_2$ in actuality even if the battery itself is heated by the energy accumulated in the battery. That is to say, the temperature increase of the battery can be suppressed to the temperature lower than $T_2$, so that the battery satisfying the conditions defined by the Equation (1) and Equation (2) is in the state with heightened safeness.

A lithium secondary battery and its transportation method of the present invention satisfying the foregoing Equation (1) are suitable for a battery with 2 Ah or higher battery capacity at the time of full charging, especially for a battery with a battery capacity as high as 5 Ah or higher and of course applicable for a battery with 2 Ah battery capacity or lower. There is no limitation of the application purposes of the battery, but the battery is especially suitable for an electric power source for driving a motor such as an electric vehicle or a hybrid electric vehicle, which are required to ensure safety, or for an electric power source for electronic installation.

As described above, the present invention prevents the battery temperature from being increased to a prescribed temperature or higher even in the case where the battery itself generates heat by an accident such as a short circuit since the accumulated energy of the battery is limited in relation to the specific heat of the battery. Consequently, this invention can provide excellent effects in that an explosion and a fire of the battery can be avoided and in that the safeness can be ensured.

What is claimed is:

1. A method of transporting a lithium secondary battery comprising an electrode body obtained by winding or laminating a positive electrode and a negative electrode via a separator, and a non-aqueous electrolyte solution, wherein said battery is transported in a state where the following Equation (2) is satisfied:

$$E/C_p + T_3 < t \tag{2}$$

wherein E (J/g) is accumulated energy quantity per unit weight of said battery; $C_p$ (J/° C.·g) is the specific heat of said battery; $T_3$ (° C.) is a normal transportation temperature of said battery; and t (° C.) is the lowest temperature at which said battery falls into an unsafe state.

2. A method of transporting a lithium secondary battery as set forth in claim 1, wherein said lowest temperature t is the boiling point of said non-aqueous electrolyte solution.

3. A method of transporting a lithium secondary battery as set forth in claim 1, wherein said lowest temperature t is the lowest temperature among the boiling points of main components of said non-aqueous electrolyte solution.

4. A method of transporting a lithium secondary battery as set forth in claim 1, wherein said lowest temperature t is the highest melting point among the melting points of main constituent materials of said separator.

5. A method of transporting a lithium secondary battery as set forth in claim 1, wherein said battery has a battery capacity of 2 Ah or higher at a time of full charging.

6. A method of transporting a lithium secondary battery as set forth in claim 1, wherein said battery is transported in an electric vehicle or a hybrid electric vehicle.

* * * * *